(12) United States Patent
Mah

(10) Patent No.: US 11,449,883 B1
(45) Date of Patent: Sep. 20, 2022

(54) SYSTEMS AND METHODS FOR DIGITAL PAYMENT REFERRALS

(71) Applicant: James Mah, Las Vegas, NV (US)

(72) Inventor: James Mah, Las Vegas, NV (US)

( * ) Notice: Subject to any disclaimer, the term of this patent is extended or adjusted under 35 U.S.C. 154(b) by 53 days.

(21) Appl. No.: 17/235,464

(22) Filed: Apr. 20, 2021

Related U.S. Application Data

(63) Continuation-in-part of application No. 16/241,514, filed on Jan. 7, 2019, now abandoned.

(51) Int. Cl.
*G06Q 30/02* (2012.01)
*G06Q 50/00* (2012.01)
*G06Q 30/06* (2012.01)

(52) U.S. Cl.
CPC ..... *G06Q 30/0214* (2013.01); *G06Q 30/0631* (2013.01); *G06Q 30/0641* (2013.01); *G06Q 50/01* (2013.01)

(58) Field of Classification Search
CPC ............ G06Q 20/384; G06Q 20/102; G06Q 30/0641; G06Q 20/12; G06Q 20/2295; G06Q 20/387; G06Q 20/3224; G06Q 20/3276; G06Q 20/0855
See application file for complete search history.

(56) References Cited

U.S. PATENT DOCUMENTS

| | | | | |
|---|---|---|---|---|
| 9,135,255 B2* | 9/2015 | Pavlidis | ................. | G06Q 50/01 |
| 9,171,326 B2* | 10/2015 | Pavlidis | ................. | G06Q 50/01 |
| 9,218,594 B2* | 12/2015 | Ramakrishna | ..... | G06Q 20/3255 |
| 9,390,408 B2* | 7/2016 | Choi | ................. | G06Q 30/0641 |
| 9,947,036 B2* | 4/2018 | Zamer | ................ | G06Q 30/0631 |
| 10,192,274 B2* | 1/2019 | Wu | ........................ | G06Q 50/01 |
| 10,311,493 B2* | 6/2019 | Pan | ..................... | G06Q 30/0625 |
| 10,373,212 B2* | 8/2019 | Systrom | ............. | G06Q 30/0269 |
| 10,521,830 B2* | 12/2019 | Systrom | ............. | G06Q 30/0277 |
| 2009/0259562 A1* | 10/2009 | Choi | ....................... | H04L 67/02 705/26.1 |
| 2011/0270662 A1* | 11/2011 | Rocco | .................... | G06Q 50/12 705/14.27 |
| 2012/0016794 A1* | 1/2012 | Orr | ....................... | G06Q 20/321 705/319 |
| 2012/0150605 A1* | 6/2012 | Isaacson | .............. | G06Q 20/227 705/14.34 |
| 2012/0158589 A1* | 6/2012 | Katzin | ................... | G06Q 20/22 705/44 |

(Continued)

*Primary Examiner* — John Villecco

(57) ABSTRACT

Systems are disclosed that enable a person to electronically refer a product or service that is for sale to a third party, which enables the third party to purchase the product or service from the applicable vendor for the benefit of the referring person. The systems generally include a server; at least one database that houses product-specific data; a product association module; and a payment module. The product association module is configured to receive digital input from an author; correlate the digital input with product identifiers stored within the database; and communicate the product identifiers to a reader. The payment module is configured to receive payment instructions from the reader for a product that is represented by the product identifiers; transfer the payment instructions to a vendor that is selling the applicable product; and communicate to the author and vendor that the product has been paid for by the reader.

12 Claims, 7 Drawing Sheets

(56) References Cited

U.S. PATENT DOCUMENTS

| | | | | |
|---|---|---|---|---|
| 2012/0226588 A1* | 9/2012 | Wuhrer | G06Q 20/12 | 705/27.1 |
| 2012/0226614 A1* | 9/2012 | Gura | G06Q 30/0605 | 705/44 |
| 2012/0245987 A1* | 9/2012 | Isaacson | G06Q 30/06 | 705/14.23 |
| 2013/0132294 A1* | 5/2013 | Schvey | G06Q 30/0207 | 705/319 |
| 2013/0204780 A1* | 8/2013 | Karri | G06Q 20/102 | 705/40 |
| 2013/0290172 A1* | 10/2013 | Mashinsky | G06Q 20/28 | 705/39 |
| 2013/0297493 A1* | 11/2013 | Linden | G06Q 40/02 | 705/39 |
| 2013/0332307 A1* | 12/2013 | Linden | G06Q 50/01 | 705/26.7 |
| 2013/0332308 A1* | 12/2013 | Linden | G06Q 30/0631 | 705/26.7 |
| 2014/0067671 A1* | 3/2014 | DeHaven | G06Q 20/351 | 705/44 |
| 2014/0089130 A1* | 3/2014 | Batra | G06Q 30/0631 | 705/26.7 |
| 2014/0089131 A1* | 3/2014 | Batra | G06F 16/21 | 705/26.7 |
| 2014/0207609 A1* | 7/2014 | Earhart | G06Q 30/0631 | 705/26.7 |
| 2014/0214666 A1* | 7/2014 | Isaacson | G06Q 30/0234 | 705/41 |
| 2014/0278998 A1* | 9/2014 | Systrom | G06Q 30/0277 | 705/14.57 |
| 2014/0279068 A1* | 9/2014 | Systrom | G06Q 30/0269 | 705/14.73 |
| 2014/0316920 A1* | 10/2014 | Wolfe | G06Q 20/22 | 705/26.1 |
| 2014/0337168 A1* | 11/2014 | Laorauvirodge | G06Q 30/0633 | 705/26.8 |
| 2015/0081473 A1* | 3/2015 | Ng | G06Q 30/0631 | 705/26.7 |
| 2015/0228009 A1* | 8/2015 | Choi | G06Q 20/325 | 705/26.81 |
| 2016/0005025 A1* | 1/2016 | Zamer | G06Q 20/384 | 705/40 |
| 2016/0042433 A1* | 2/2016 | Bank | G06Q 30/0631 | 705/26.7 |
| 2016/0063649 A1* | 3/2016 | Zamer | G06Q 20/10 | 705/39 |
| 2016/0086249 A1* | 3/2016 | Zamer | G06Q 30/0633 | 705/26.7 |
| 2017/0132690 A1* | 5/2017 | Todd | G06Q 20/102 | |
| 2017/0161696 A1* | 6/2017 | Hattar | G06Q 20/042 | |
| 2018/0365749 A1* | 12/2018 | Zamer | G06Q 30/0639 | |
| 2019/0066190 A1* | 2/2019 | Pedroso | G06Q 30/0633 | |
| 2019/0180271 A1* | 6/2019 | Swanson | H04L 51/04 | |
| 2019/0303998 A1* | 10/2019 | Patil | G06Q 30/0631 | |
| 2019/0306137 A1* | 10/2019 | Isaacson | G06Q 20/20 | |
| 2019/0377739 A1* | 12/2019 | Levinsky | G06Q 50/01 | |
| 2020/0067868 A1* | 2/2020 | Werner | H04L 51/212 | |

* cited by examiner

Selection Sort Algorithm Calculated Score (SSACS)

SSACS = Subpart A (SA) + Subpart B (SB)

---

Subpart A (SA) // Represents Vendor-Specific Geographical Information

- A = Physical Distance Between The Author 8 And Vendor 14 (Weighted at 50%)

- If Distance* is less than 1 mile, A = 10
    - If Distance ranges between 1 – 3 miles, A = 7
    - If Distance is greater than 3 miles and less than or equal to 5 miles, A = 4
    - If Distance is greater than 5 miles, A = 1

- B = Time Of Commute Between The Author 8 And Vendor 14 (Weighted at 50%)

- If Time* is less than 5 minutes, B = 10
    - If Time ranges between 5 – 10 minutes, B = 7
    - If Time is greater than 10 minutes and less than 15 minutes, B = 4
    - If Time is greater than or equal to 15 minutes, B = 1

Subpart A (SA) = A(0.5) + B(0.5)

* Constants may be obtained from and calculated using publicly-accessible and Internet-accessible mapping applications.

---

Subpart B (SB) // Represents Product-Specific Metrics

- S = Social Media Activity Related To The Product (Weighted at 50%)

- If greater than 100 separate social media posts regarding a product, S = 10
    - If between 50 – 99 separate social media posts regarding a product, S = 7
    - If between 20 – 49 separate social media posts regarding a product, S = 4
    - If less than 20 separate social media posts regarding a product, S = 1

- R = A Number Of Positive Reviews Associated With The Product (Weighted at 50%)

- If greater than 100 separate positive reviews regarding a product, R = 10
    - If between 50 – 100 separate positive reviews regarding a product, R = 7
    - If between 20 – 49 separate positive reviews regarding a product, R = 4
    - If less than 20 separate positive reviews regarding a product, R = 1

Subpart B (SB) = S(0.5) + R(0.5)

* Constants may be obtained from and calculated using one or more publicly-accessible and Internet-accessible social networks, search engines, and/or e-commerce platforms.

Figure 7

SYSTEMS AND METHODS FOR DIGITAL PAYMENT REFERRALS

CROSS-REFERENCE TO RELATED APPLICATIONS

This is a continuation-in-part application of U.S. patent application Ser. no. 16/241,514, filed on Jan. 7, 2019.

FIELD OF THE INVENTION

The field of the present invention relates to systems and methods for digital payment referrals. More particularly, the present invention relates to systems and methods that enable a prospective customer to electronically refer a product or service that is for sale to a third party, which further enables the third party to, optionally, purchase the product or service from the applicable vendor for the benefit of the referring customer.

BACKGROUND OF THE INVENTION

Digital technologies have served to enhance communication and extend the reach and rapidity of human interactions. Such technologies can be applied to solve long-standing problems and to add novelty to traditional customs. The invention described herein provides technological solutions that can be employed to enable a third party to pay for another person's meal, beverage, desired product, or service. Although such a transaction may seem commonplace, there are several societal situations and logistical barriers that render such a transaction awkward and/or complicated (if not impossible).

For example, Buddhist Monks often travel with little or no money and rely on the surrounding community to provide their meals and everyday services. It is not unusual for Monks to finish a meal or a service and sit and wait for members of the community to pay for a portion (or all) of the bill. All the while, restaurants and service vendors are reticent to ask Monks to leave as they have an unpaid bill and culturally this would be taboo. As a result, a table is often occupied for a prolonged period of time during which the restaurant or vendor may be losing potential revenue.

In another example, co-workers may be enjoying a drink or meal after a long and exhausting workweek. The co-workers post images of their experience from within the restaurant, along with images of themselves and the meal, onto a social network page. Some time later, their manager observes the social network page and recognizes the co-workers (and wishes to "buy the drinks" for the co-workers in appreciation for their hard work). Currently-available payment systems and methods do not allow such a transaction to take place, without undue complication.

For example, exact costs of the drinks or meal are not obvious and would need to be researched; once the decision is made by the manager to pay for each co-worker's meal, the restaurant would need to be contacted and the co-workers identified out of all the patrons present inside the restaurant; verification that payment was applied to the correct patron's bill may be time consuming; and, furthermore, the manager may need a receipt for accounting purposes. These are only some of the issues and complications that make undertaking such a transaction awkward, lengthy, and laborious.

As the following will demonstrate, the systems and methods of the current invention address these (and many other) demands in the marketplace.

SUMMARY OF THE INVENTION

According to certain aspects of the invention, systems and methods for digital payment referrals are provided. The systems generally include a server that is equipped with a central processor and memory facilities; at least one database that houses product-specific data in communication with the server; and a product association module. The product association module is located within, or is otherwise accessible by, the server. The product association module is configured to receive digital input from an author (i.e., a prospective customer); correlate the digital input with product identifiers stored within the database; and electronically communicate the product identifiers to a reader (i.e., a prospective third party purchaser). The systems further include a payment module, located within or accessible by the server. The payment module is configured to electronically (i) receive payment instructions from the reader for a product that is represented by the product identifiers; (ii) transfer such payment instructions to a vendor that is selling the product that is represented by the product identifiers; and (iii) communicate to the author and vendor that the product that is represented by the product identifiers has been, partially or wholly, paid for by the reader. As used herein, the term "product" should (unless otherwise stated) be given an expansive meaning—including tangible products, digital products, services, food items, and others.

The invention provides that the digital input submitted by the author may include a digital image, video clip, manually-entered text, audio content transcribed into text, or a combination of the foregoing—which pertains to the product that is represented by the product identifiers. The invention provides that the product association module is configured to correlate such digital input with product identifiers stored within the database, by executing a matching function which compares the digital input to a set of known digital inputs that are pre-correlated to product identifiers within the database. In certain preferred embodiments, the product association module will employ a combination algorithm that requires at least two (any combination of two) separate digital inputs to be received, whereupon the product association module will automatically execute the correlation of such digital inputs with product identifiers stored within the database. In addition, the invention provides that the product association module may, optionally, receive author location information, which may further be utilized by the product association module to correlate the submitted digital input with product identifiers stored within the database (such author location information may further be utilized by the payment module to locate one or more vendors selling products that are represented by the product identifiers). For example, the product association module may receive author location information in the form of location details that are manually submitted by the author; global positioning satellite (GPS) coordinates; and other location-specific details (e.g., physical distance to a vendor, time of commuting to a vendor, population density metrics, news information, and weather information).

In certain embodiments, the server is configured to be periodically updated by users of the system. More particularly, for example, the server is preferably configured to modify and supplement the set of known digital inputs that are pre-correlated to product identifiers within the database, based on information submitted to the server by a system administrator, authors, and readers. This way, the database contains as much updated and current information as possible, such that the database (along with the product association module) are configured to quickly and accurately identify products that are correlated with digital input provided by a plurality of authors.

The invention provides that the product identifiers may include a vendor name; a description of the product that is represented by the product identifiers; a purchase price; one or more locations (vendors) where the product may be purchased; or, preferably, a combination of the foregoing. In certain embodiments, the system further comprises a centralized website, or an application programming interface (APIs) configured to communicate with a social network, through which the author submits digital input to the server. In addition, in such embodiments, the invention provides that the payment module is configured to receive payment instructions from the reader through the centralized website or social network.

According to additional aspects of the invention, methods for digitally referring payment for purchasing a product from one party to another are provided. Such methods generally entail operation of the systems of the present invention, as described herein.

The above-mentioned and additional features of the present invention are further illustrated in the Detailed Description contained herein.

BRIEF DESCRIPTION OF THE FIGURES

FIG. 7 non-limiting examples of how subpart scores (described herein) could be calculated to represent vendor-specific geographical information and product-specific metrics.

DETAILED DESCRIPTION OF THE INVENTION

Figure 1:
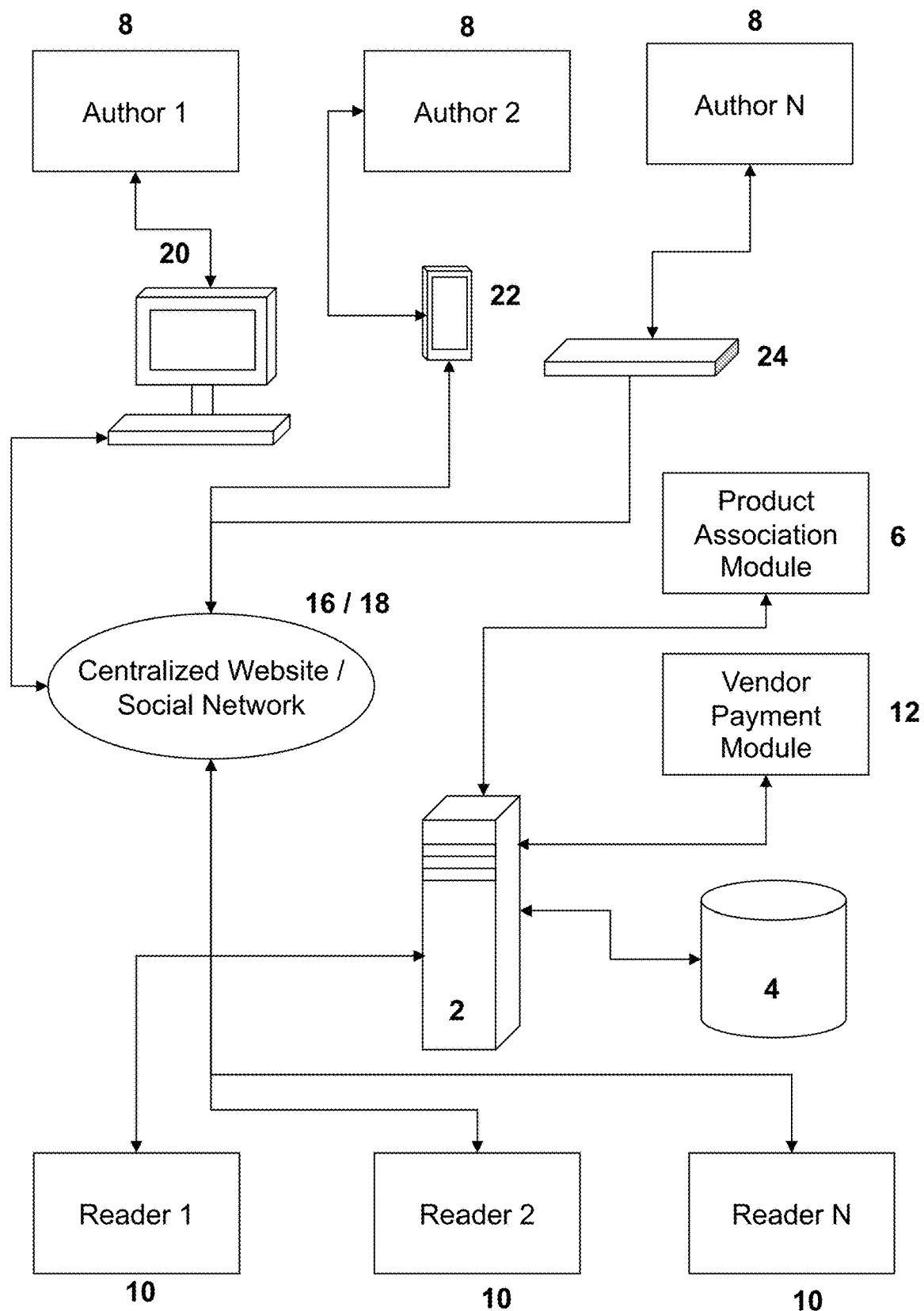
FIG. 1 is a diagram showing the various components of the systems described herein.

The following will describe, in detail, several preferred embodiments of the present invention. These embodiments are provided by way of explanation only, and thus, should not unduly restrict the scope of the invention. In fact, those of ordinary skill in the art will appreciate upon reading the present specification and viewing the present drawings that the invention teaches many variations and modifications, and that numerous variations of the invention may be employed, used and made without departing from the scope and spirit of the invention.

Referring now to FIGS. 1-7, according to certain preferred embodiments of the present invention, systems and methods for digital payment referrals are provided. The systems generally include a server 2 that houses a central processor and memory facilities (e.g., conventional storage, random-access memory (RAM), and other types of memory), which is operably connected to (and in communication with) one or more databases 4 that house product-specific data. When the present specification refers to the server 2, the invention provides that the server 2 may comprise a single server or a group of servers. In addition, the invention provides that the system may employ the use of cloud computing, whereby the server paradigm that is utilized to support the system of the present invention is scalable and may involve the use of different servers (and a variable number of servers) at any given time, depending on the number of individuals who are utilizing the system at different time points, which are in fluid communication with the database 4 described herein.

According to certain preferred embodiments, the systems of the present invention further include a product association module 6—which is located within, or is otherwise accessible by, the server 2. The product association module 6 is configured to receive digital input from an author 8 (or a plurality of authors 8). The digital input may comprise digital images, video clips, manually-entered text, audio content (which is subsequently transcribed into text using readily-available software applications), or other forms of digital information that relates to or identifies a particular product. As used herein, the term "author(s)" 8 refers to one who initiates a digital payment referral using the system described herein, by submitting digital input to the server 2 (the author 8 is typically someone who wishes to purchase, or is in the process of purchasing, a specific product). The invention provides that an author 8 may be an individual, a group of people, or an organization, e.g., a separate legal entity. As used herein, the term "product(s)" refers to tangible goods, digital goods, services, or a combination of the foregoing.

The invention provides that the product association module 6 is configured to correlate an author's 8 digital input with product identifiers stored within the database 4 and, following such correlation step, electronically communicate the product identifiers to a reader 10. As used herein, the term "reader(s)" 10 refers to an individual, a group of people, or an organization, e.g., a separate legal entity, which is notified of an author's 8 submission of digital input to the server 2 and receives product identifiers associated with such digital input as described herein. In certain preferred embodiments, the product association module 6 will employ a combination algorithm that requires at least two (any combination of two) separate digital inputs to be received, whereupon the product association module 6 will automatically execute the correlation of such digital inputs with product identifiers stored within the database 4. For example, upon submission of any combination of (two or more) digital images, video clips, manually-entered text, audio content transcribed into text, and other digital inputs, the product association module 6 will automatically execute the correlation of such digital inputs with product identifiers stored within the database 4 (such correlation step is further discussed below).

In addition, the invention provides that the product association module 6 may, optionally, receive author 8 location information, which may further be utilized by the product association module 6 to correlate the submitted digital input with product identifiers stored within the database 4 (and, as described further below, identify and locate vendors 14 associated with such product identifiers). For example, the product association module 6 may receive author location information in the form of location details (e.g., address information) that are manually submitted to the product association module 6 by the author 8; global positioning satellite (GPS) coordinates; and other location-specific details (e.g., physical distance to a vendor 14, time of commuting to a vendor 14, population density metrics, and applicable news and weather data). More particularly, for example, the device used by an author 8 to submit digital input to the server 2/product association module 6, such as the desktop computers 20, mobile phones 22, tablets 24, and wearable networked devices (e.g., so-called smart watches) mentioned above, may further submit geolocation data to the server 2. Such geolocation data may be harvested by such devices through imbedded global positioning satellite (GPS) functions that such devices routinely employ today. According to such embodiments, the system and product association module 6 may be able to more accurately and quickly identify the product identifiers and available vendors 14 that are associated with an author's 8 digital input by taking into account such author 8 location information—e.g., which may inform the system and product association module 6 that the author 8 is currently located within a particular store (vendor 14). Likewise, when an author 8 is located a distance from a vendor 14 that is selling a particular product, any publicly-accessible information that can be harvested through automated Internet searches, such as current news and weather information pertaining to a location associated with a vendor 14, may be provided to the product association module 6.

In certain embodiments, the invention provides that the system may, optionally, be configured to require that permission be granted by an author 8 that allows a reader 10 to receive such notification of an author's 8 submission of digital input to the server 2 and the associated product identifiers (conversely, the system may, optionally, also be configured to require that permission be granted by a reader 10 that allows an author 8 to submit digital input and the associated/ retrieved product identifiers to the reader 10). The invention provides that the server 2 may be configured to solicit and/or receive such approvals through digital forums, social networks (medias), email contact lists, or other forms of electronic communication. As used herein, the term "product identifiers" refers to information relating to a particular product (or group of products), such as a vendor 14 name; a description of the product(s); a purchase price; one or more locations where the product(s) may be purchased; or, preferably, a combination of the foregoing.

The systems further include a payment module 12, located within or accessible by the server 2. The payment module 12 is preferably configured to electronically receive payment instructions from the reader 10 for a product that is represented by the product identifiers. More particularly, upon receiving notification of an author's 8 submission of digital input to a server 2 and the correlated product identifiers, if the reader 10 wishes to pay for the product represented by such product identifiers for the benefit of the submitting author 8, the reader 10 may submit payment instructions to the payment module 12 of the system. Non-limiting examples of such payment instructions include credit card numbers and related data needed to execute a credit card transaction; debit card numbers and related data needed to execute a debit card transaction; bank account numbers, bank routing numbers, and related data needed to execute a bank-mediated transfer of funds; or other data used to consummate electronic payments. The invention provides that such payment instructions are preferably submitted to, and then stored within, the system in an encrypted format. The payment module 12 is further configured to transfer (or grant access to) such payment instructions to a vendor 14 that is selling the product that is represented by the product identifiers. In addition, the payment module 12 is further configured to communicate to the author 8 and vendor 14 that the product that is represented by the product identifiers has been, partially or wholly, paid for by the reader 10.

As mentioned above, the invention provides that the product association module 6 is configured to correlate an author's 8 digital input with product identifiers stored within the database 4 and, following such correlation step, electronically communicate the product identifiers to a reader 10. The invention provides that the digital input submitted by the author 8 will preferably include a combination of two or more digital inputs, selected among digital images, video clips, manually-entered text, and audio content transcribed into text (such transcription may take place prior to submission to the server 2, or within the server 2, using standard audio transcription applications). The invention provides that such digital input may be submitted by the author 8 to the server 2 via any suitable electronic device, such as a desktop computer 20, a mobile phone 22, tablet 24, wearable networked devices (e.g., so-called smart watches), or other electronic devices.

The invention provides that the product association module 6 is configured to correlate such digital input with the product identifiers stored within the database 4, by executing a matching function that compares the digital input to a set of known digital inputs that are correlated to product identifiers within the database 4. More particularly, for example, the product association module 6 is preferably configured to execute digital image recognition applications (based on still digital images, as originally submitted to the server 2 or extracted from submitted digital video clips), which can be used to match an author's 8 submitted image (digital input) with existing images of a product stored within the database 4 (such that the submitted image can be matched with an existing image of a product and the associated product identifiers identified and retrieved). The invention provides that the submitted digital image may be an image of the product itself, product packaging, a trademark associated with the product, a barcode associated with a universal product number (UPC), or other visual identifiers of the product. Similarly, if the digital input is submitted as manually-entered text, or audio content that is transcribed into text by the system (or third party application), the product association module 6 is preferably configured to execute a key word matching function, whereby the product association module 6 matches one or more words contained within the submitted text (the author's digital input) with known key words (known digital input) included within a table that is housed within the database 4, which are correlated with various products and corresponding product identifiers.

Figure 2:
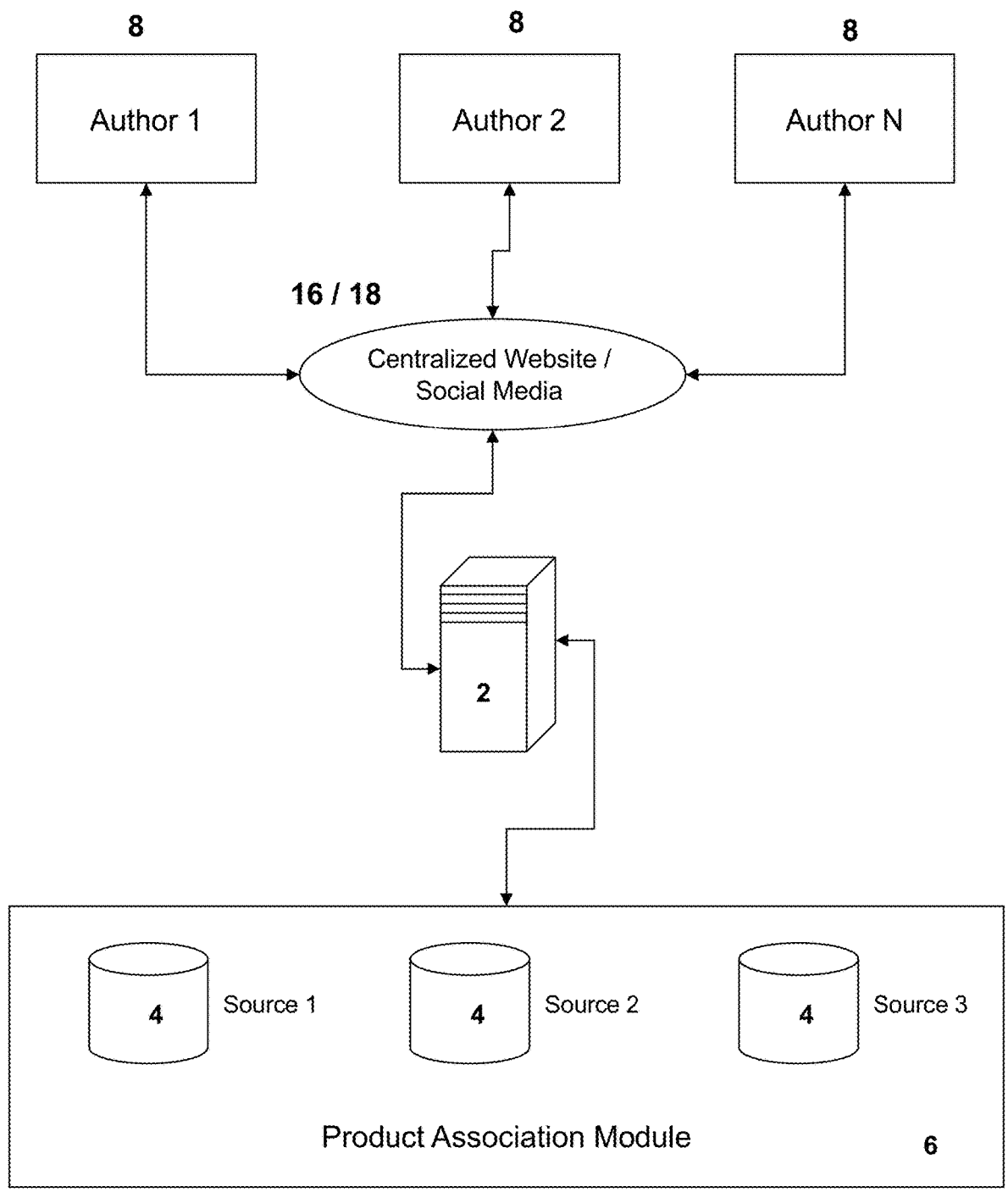
FIG. 2 is a diagram showing the product association module of the systems described herein.
Figure 3:
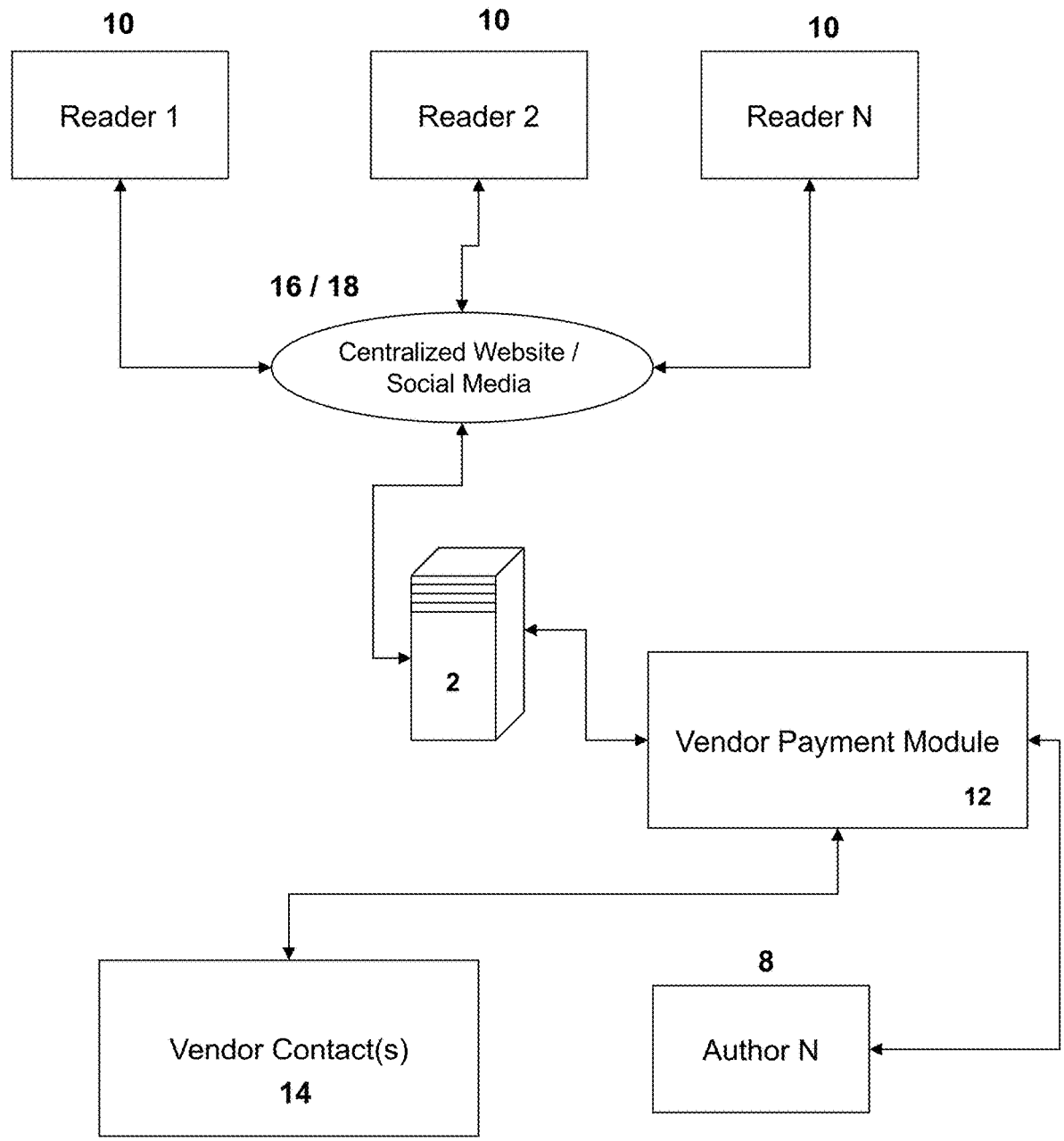
FIG. 3 is a diagram showing the vendor payment module of the systems described herein.

As illustrated in FIG. 2, the invention provides that the system may include, and the server 2 may communicate with, multiple databases 4 that contain images of products, key words associated with products, etc., such that the system and product association module 6 may draw upon as much information as possible to quickly and accurately associate digital input with specific products and the related product identifiers. In addition to images and text, as described above and further below, the product association module 6 may utilize geolocation data to associate digital input with a particular product (and its product identifiers). More particularly, for example, the device used by an author 8 to submit digital input to the server 2, such as the desktop computers 20, mobile phones 22, tablets 24, and wearable networked devices (e.g., so-called smart watches) mentioned above, may further submit geolocation data to the server 2. Such geolocation data may be harvested by such devices through imbedded global positioning satellite (GPS) functions that such devices routinely employ today. According to such embodiments, the system and product association module 6 may be able to more accurately and quickly identify the products (and its product identifiers) associated with an author's 8 digital input by taking into account his/her geographical location—e.g., which may inform the system and product association module 6 that the author 8 is currently located within a particular store (vendor 14).

In certain preferred embodiments, after the product association module 6 correlates the digital input with product identifiers stored within the database 4, the system is configured to electronically communicate the product identifiers to a reader 10 (with the product identifiers being correlated with one or more products for sale by one or more vendors 14), in the form of a menu of options in which the one or more products for sale are ranked according to a selection sort algorithm. In such embodiments, the selection sort algorithm ranks the one or more products for sale according to a calculated score, with the calculated score representing a sum of two weighted subparts. In such embodiments, a first weighted subpart represents vendor-specific geographical information and a second weighted subpart represents product-specific metrics. More specifically, the vendor-specific geographical information will be a weighted score representing a product of physical distance from the author to the vendor; time of commute from the author to the vendor; population density metrics associated with vendor location; news data associated with vendor location; and weather data associated with vendor location. The invention provides that the product-specific metrics will be represented as a weighted score that represents social media activity pertaining to the product; a number of reviews associated with the product; a number of negative reviews associated with the product; a number of positive reviews associated with the product; and cost to purchase the product.

To further illustrate such embodiments, the calculated score may represent the sum of Subpart-A (vendor-specific geographical information) and Subpart-B (product-specific metrics). Subpart-A may be calculated based upon a series of weighted factors pertaining the location of a particular matched vendor 14, e.g., the physical distance between the author 8 and vendor 14 (e.g., weighted at 35%); time of commute between the author 8 and vendor 14 (e.g., weighted at 35%); population density associated with vendor 14 location (e.g., weighted at 10%); news data associated with vendor 14 location (e.g., weighted at 10%); and weather data associated with vendor 14 location (e.g., weighted at 10%). Subpart-B may be calculated based upon a series of weighted factors pertaining to a desired product, e.g., social media activity related to the product (e.g., weighted at 60%); a number of reviews associated with the product (e.g., weighted at 10%); a number of positive reviews associated with the product (e.g., weighted at 10%); a number of negative reviews associated with the product (e.g., weighted at 10%); and cost to purchase the product (e.g., weighted at 10%). The invention provides that Subpart-B is particularly germane and useful when an author's 8 digital input is correlated by the system with multiple sets of product identifiers (i.e., multiple different products). In addition, the weights assigned to the various factors above are provided for illustration. The invention provides that such weights prescribed for each of the factors (and other parameters), for both Subpart-A (vendor-specific geographical information) and Subpart-B (product-specific metrics), may be modulated as desired by a user of the system described herein. FIG. 7 provides yet further illustrations, and a more simplified example, of how such scores may be calculated by the system.

In certain embodiments, the server 2 is configured to be updated by users of the system. More particularly, for example, the server is preferably configured to modify and supplement the set of known digital inputs that are correlated to product identifiers within the database 4, based on information submitted to the server 2 by a system administrator, authors 8, and readers 10. For example, if the product association module 6 is unable to correlate an image (digital input) with a product (and its product identifiers) based on the information available within the database 4, the product association module 6 may be configured to send an electronic inquiry to the submitting author 8, which asks the author 8 to manually enter the name of the subject product, its vendor 14, the author's current location, and other relevant identifying information. This information, along with the originally submitted digital input, may then be added to and stored within the database 4 for future reference. This way, the database 4 contains as much updated and current information as possible, such that the database 4 (along with the product association module 6) are configured to quickly and accurately identify products that are correlated with digital input provided by a plurality of authors 8.

According to certain preferred embodiments, the system further comprises a centralized website 16, or an application programming interface (APIs) configured to communicate with a social network 18, through which the author 8 submits digital input to the server 2. In addition, in such embodiments, the invention provides that the payment module 12 is configured to receive payment instructions from the reader 10 through the centralized website 16 or social network 18. In other embodiments, the systems described herein—and the methods of using the same—may be executed between an author's 8 device (e.g., a desktop computer 20, a mobile phone 22, tablet 24, wearable networked device, etc.), a reader's 10 similar device, and the server 2 through a software application that may be downloaded into such devices (such that a centralized website 16 or social network 18 are not required). In those embodiments, the system may communicate with each device holder, and each device holder may communicate with the system, through the software application residing on such devices, e-mail, short message service (SMS) communications (i.e., texting), and/or other means.

Figure 4:
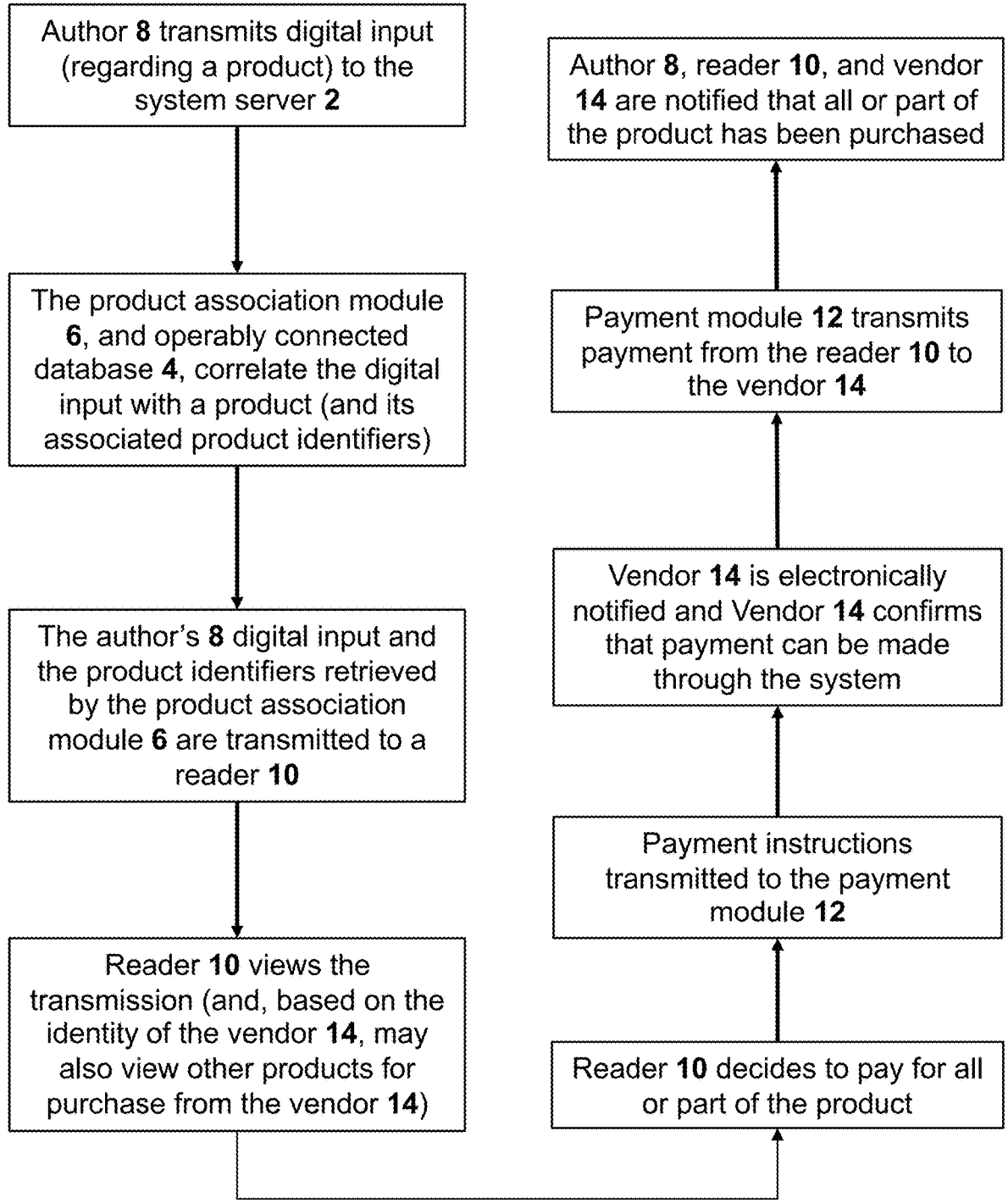
FIG. 4 is a flow diagram that generally summarizes the methods of using the systems described herein.
Figure 5:
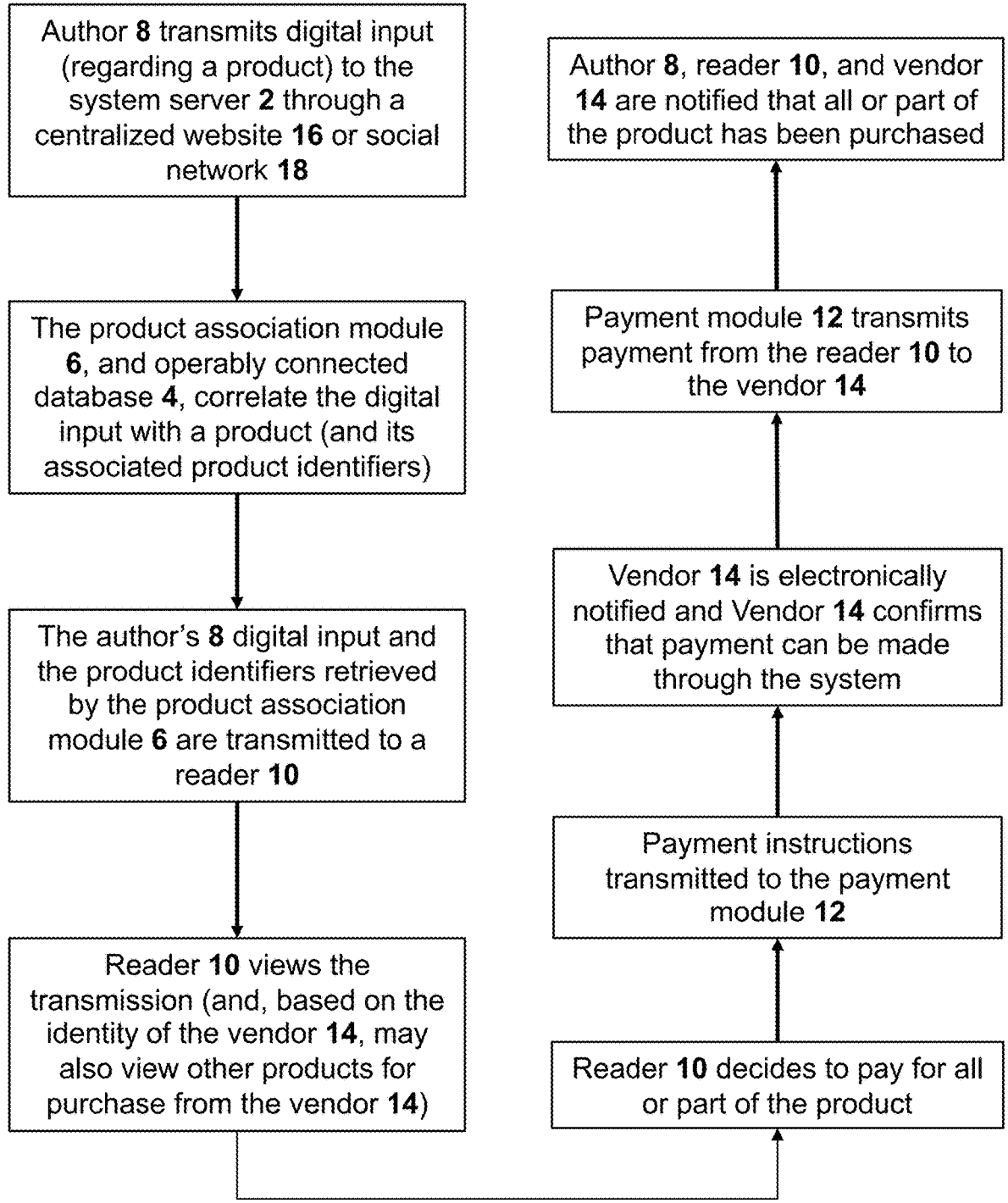
FIG. 5 is another flow diagram that generally summarizes the methods of using the systems described herein, particularly those that utilize a centralized website or third party social network.
Figure 6:
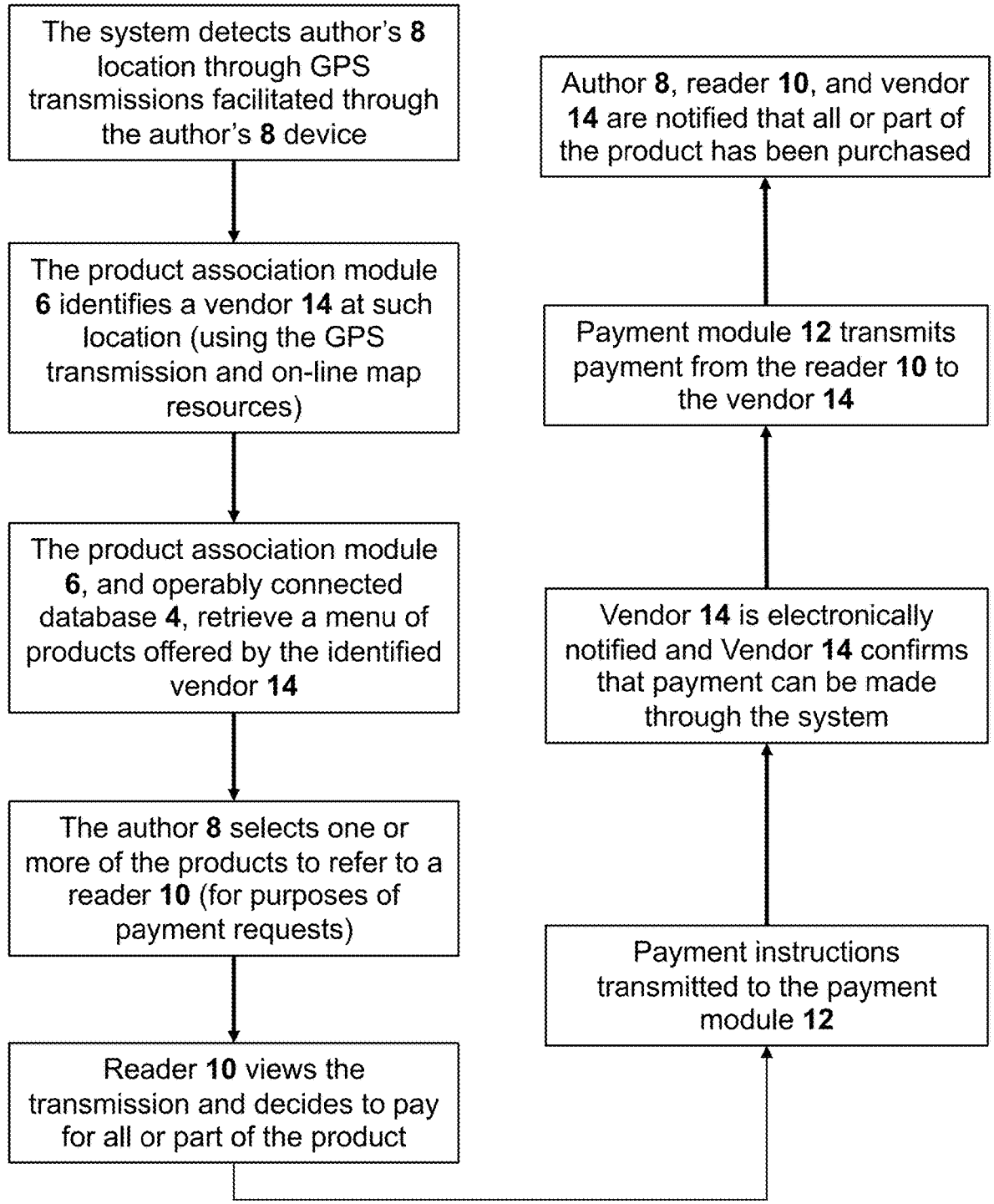
FIG. 6 is another flow diagram that generally summarizes the methods of using the systems described herein, particularly those that utilize geolocation systems.

Referring now to FIGS. 4-6, according to additional aspects of the invention, methods for digitally referring payment for purchasing a product from one party to another are provided. Such methods generally entail the use and operation of the systems of the present invention, as described herein. More particularly, as summarized in FIG. 4, the methods of the present invention may begin with an author 8 submitting digital input (regarding a product) to the system server 2. The product association module 6, along with the database 4, correlates the digital input with a certain product (and its product identifiers). As described herein, such correlation may be based on various types of digital input provided to the server 2, such as digital images, digital video clips, manually-entered text, audio content transcribed into text, geolocation data, and/or other forms of data pertaining to a product. Next, the system transmits the author's 8 digital input, and the product identifiers retrieved by the product association module 6, to a reader 10. The reader 10 is then able to review the transmission.

Next, the reader 10 decides whether he/she wishes to pay for all, or a portion, of the product that is correlated with the product identifiers. If the reader 10 does wish to make such a purchase, the reader 10 may electronically respond accordingly to the system (through the reader's 10 device, e.g., a desktop computer 20, a mobile phone 22, tablet 24, wearable networked device, etc.). The reader's 10 indication of intent to purchase the product is communicated to the payment module 12 of the system. The payment module 12 then sends an electronic notice to the applicable vendor 14 of the reader's 10 desire to purchase the product, which the vendor 14 then has the ability to electronically confirm or deny through the system (e.g., the vendor 14 may wish to deny the transaction if the author 8 has already paid). If approved, the payment module 12 executes payment for the product by the reader 10 for the benefit of the author 8 (with the applicable vendor 14 receiving the transmitted payment). After payment has been executed, the author 8, reader 10, and vendor 14 receive an electronic communication, indicating that the reader 10 has purchased the product. As illustrated in FIG. 5, the foregoing steps and methods may also be executed through an intermediary, namely, a centralized website 16 or social network 18.

As mentioned above and further illustrated in FIG. 6, in certain embodiments, the invention provides that the system and product association module 6 may utilize geolocation data to identify an author's 8 product of interest. For example, the invention provides that the system may detect an author's 8 geographic location through GPS transmissions facilitated through the author's 8 device (e.g., desktop computer 20, mobile phone 22, tablet 24, wearable networked device, etc.). The product association module 6 then identifies a vendor 14 at such location (using the GPS transmission and on-line mapping resources). The author 8 is then invited to electronically confirm that the identified vendor 14 is correct (if not, the product association module 6 may produce a list of other vendors 14 within geographic proximity of the detected GPS coordinates). Once the author 8 confirms a particular vendor 14 is correct, the author 8 is presented with a pre-defined list (menu) of products offered by that vendor 14 (which are housed within a database 4 of the system, and which may be regularly updated by the system). The author 8 may then select a particular product (or group of products) from that menu, which the author 8 wishes to refer (for purposes of payment) to a reader 10. At that point, the reader 10 is able to review the transmission and, optionally, submit payment therefor according to the same (or similar) steps described above with respect to the other embodiments of the present invention.

According to yet further embodiments, certain systems and methods of the present invention enable a reader 10 to publish a digital comment within an on-line review forum or website for a particular vendor 14 (or within a forum or website that is otherwise associated with a product of a vendor 14). The system may further enable the reader 10 to then electronically refer the comment—through the system—to a particular author 8. In such embodiments, the invention provides that the system is configured to enable the reader 10 to embed a coupon within the comment, which the receiving author 8 (and only the receiving author 8) may redeem (e.g., the coupon may allow the author 8 to purchase the applicable product at no cost or at a discounted price). The invention provides that the embedded coupon may relate to the product offered by the vendor 14 associated with the on-line forum (website) and/or a product offered by a competitor of the vendor 14. In such embodiments, if the author 8 redeems the coupon, the system is configured to enable the vendor 14 of the applicable product to collect the appropriate payment from the reader 10 through the payment module 12 described herein.

More particularly, in such embodiments, the product association module 6 and the at least one database 4 are configured to receive digital input from a reader 10, with the digital input being in the form of a comment or review published by the reader 10 within an on-line forum or website. The product association module 6 is further configured (based on the key word matching functions mentioned above) to correlate the digital input with a product of interest (typically, the product of interest will be a product offered by a vendor 14 associated with the on-line forum or website). Still further, the invention provides that the product association module 6 of such embodiments is configured to electronically embed a digital coupon within the comment or review (with the digital coupon being configured to be redeemed by an author 8 that is identified by the reader 10, with the value of the coupon being assigned by the reader 10). In addition, in such embodiments, the payment module 12 is configured to electronically: enable the author 8 to redeem the coupon; transfer payment instructions to the applicable vendor 14 that is selling the product of interest; transfer payment, for the value of the coupon, from the reader 10 to the vendor 14; and communicate to the author 8, vendor 14, and reader 10 that the product of interest has been, partially or wholly, paid for by the reader 10.

The many aspects and benefits of the invention are apparent from the detailed description, and thus, it is intended for the following claims to cover all such aspects and benefits of the invention that fall within the scope and spirit of the invention. In addition, because numerous modifications and variations will be obvious and readily occur to those skilled in the art, the claims should not be construed to limit the invention to the exact construction and operation illustrated and described herein. Accordingly, all suitable modifications and equivalents should be understood to fall within the scope of the invention as claimed herein.

What is claimed is:

1. A system for digital payment referrals, which comprises:
   (a) a server that includes a central processor and memory facilities;
   (b) at least one database that houses product-specific data in communication with the server;
   (c) a product association module, which is located within the server and is executed by the central processor, wherein the product association module is configured to (i) receive digital input from an author, wherein the digital input comprises any combination of two or more digital inputs selected from the group consisting of digital images, video clips, manually-entered text, and audio content transcribed into text; (ii) receive author location information; (iii) correlate the digital input with product identifiers stored within the database by executing a matching function which compares the digital input submitted by the author to a set of known digital inputs that are correlated to the product identifiers within the database; and (iv) electronically communicate to a reader the product identifiers that are correlated with known digital inputs that match the digital input submitted by the author, wherein such product identifiers are further correlated with one or more products for sale by one or more vendors;
   (d) a payment module, which is located within the server and executed by the central processor, wherein the payment module is configured to electronically (i) receive payment instructions from the reader for a product selected by the reader from the one or more products for sale that are represented by the product identifiers; (ii) transfer said payment instructions to a vendor that is selling the product that is selected by the reader; and (iii) communicate to the author and vendor that the product selected by the reader has been, partially or wholly, paid for by the reader, wherein the author location information is submitted directly by the author to the product association module or comprises global positioning satellite (GPS) coordinates provided by a computing device being operated by the author, wherein the product identifiers correlated with one or more products for sale by the one or more vendors are electronically communicated to the reader as a menu of options in which the one or more products for sale are ranked according to a selection sort algorithm, wherein the selection sort algorithm ranks the one or more products for sale according to a calculated score, wherein the calculated score is a sum of two weighted subparts, with a first weighted subpart representing vendor-specific geographical information and a second weighted subpart representing product-specific metrics, and wherein the vendor-specific geographical information is a weighted score representing a physical distance between the author and the vendor; time of commute from the author to the vendor; population density metrics associated with vendor location; news data associated with the vendor location; and weather data associated with the vendor location.

2. The system of claim 1, wherein the product-specific metrics are represented by a weighted score that represents social media activity pertaining to the product; a number of reviews associated with the product; a number of negative reviews associated with the product; a number of positive reviews associated with the product; and cost to purchase the product.

3. The system of claim 2, wherein the server is configured to modify and supplement the set of known digital inputs that are correlated to product identifiers within the database, based on information submitted to the server by a system administrator, authors, and readers.

4. The system of claim 3, wherein the product identifiers comprise vendor name;
   a description of the product that is represented by the product identifiers; a purchase price; and
   one or more locations where the product may be purchased.

5. The system of claim 4, wherein the system further comprises a centralized website, or an application programming interface configured to communicate with a social network, through which the author submits said digital input to the server.

6. The system of claim 5, wherein the payment module is configured to receive payment instructions from the reader through the centralized website or social network.

7. A method for digitally referring payment for purchasing a product from one party to another, which comprises:
   (a) operating a server that includes a central processor and memory facilities;
   (b) operating at least one database that houses product-specific data in communication with the server;
   (c) operating a product association module, which is located within the server and is executed by the central processor, wherein the product association module is configured to (i) receive digital input from an author, wherein the digital input comprises any combination of two or more digital inputs selected from the group consisting of digital images, video clips, manually-entered text, and audio content transcribed into text; (ii) receive author location information; (iii) correlate the digital input with product identifiers stored within the database by executing a matching function which compares the digital input submitted by the author to a set of known digital inputs that are correlated to the product identifiers within the database; and
   (iv) electronically communicate to a reader the product identifiers that are correlated with known digital inputs that match the digital input submitted by the author, wherein such product identifiers are further correlated with one or more products for sale by one or more vendors;
   (d) operating a payment module, which is located within the server and executed by the central processor, wherein the payment module is configured to electronically (i) receive payment instructions from the reader for a product selected by the reader from the one or more products for sale that are represented by the product identifiers; (ii) transfer said payment instructions to a vendor that is selling the product that is selected by the reader; and (iii) communicate to the author and vendor that the product selected by the reader has been, partially or wholly, paid for by the reader;

wherein the author location information (a) is submitted directly by the author to the product association module or (b) comprises global positioning satellite (GPS) coordinates provided by a computing device being operated by the author;

wherein the product identifiers correlated with one or more products for sale by the one or more vendors are electronically communicated to the reader as a menu of options in which the one or more products for sale are ranked according to a selection sort algorithm;

wherein the selection sort algorithm ranks the one or more products for sale according to a calculated score, wherein the calculated score is a sum of two weighted subparts, with a first weighted subpart representing vendor-specific geographical information and a second weighted subpart representing product-specific metrics; and wherein the vendor-specific geographical information is a weighted score representing a physical distance between the author and the vendor; time of commute from the author to the vendor; population density metrics associated with vendor location; news data associated with the vendor location; and weather data associated with the vendor location.

8. The method of claim 7, wherein the product-specific metrics are represented by a weighted score that represents social media activity pertaining to the product; a number of reviews associated with the product; a number of negative reviews associated with the product; a number of positive reviews associated with the product; and cost to purchase the product.

9. The method of claim 8, wherein the server is configured to modify and supplement the set of known digital inputs that are correlated to product identifiers within the database, based on information submitted to the server by a system administrator, authors, and readers.

10. The method of claim 9, wherein the product identifiers comprise vendor name; a description of the product that is represented by the product identifiers; a purchase price; and one or more locations where the product may be purchased.

11. The method of claim 10, wherein an author submits said digital input to the server through a centralized website or an application programming interface configured to communicate with a social network.

12. The method of claim 11, wherein the payment module is configured to receive payment instructions from the reader through the centralized website or social network.

\* \* \* \* \*